United States Patent [19]

Weiss et al.

[11] 4,211,375
[45] Jul. 8, 1980

[54] CHUCK FOR WEBS OF MATERIAL WOUND ONTO SPOOLS

[75] Inventors: Peter Weiss, Neuss; Karl Thievessen, Düsseldorf, both of Fed. Rep. of Germany

[73] Assignee: Jagenberg Werke Atkiengesellschaft, Düsseldorf, Fed. Rep. of Germany

[21] Appl. No.: 26,511

[22] Filed: Apr. 3, 1979

[30] Foreign Application Priority Data

Apr. 3, 1978 [DE] Fed. Rep. of Germany ....... 2814338

[51] Int. Cl.² ...................... B21C 47/00; B65H 17/02
[52] U.S. Cl. ....................................... 242/81; 242/68.4
[58] Field of Search ........................ 242/68.4, 81, 68.3

[56] References Cited

U.S. PATENT DOCUMENTS

| | | | |
|---|---|---|---|
| 2,249,379 | 2/1941 | Ford | 242/81 |
| 2,306,466 | 12/1942 | Patterson | 242/81 X |
| 2,985,401 | 5/1961 | Gazet | 242/81 |
| 3,945,585 | 3/1976 | Moslener | 242/81 |

Primary Examiner—Edward J. McCarthy

Attorney, Agent, or Firm—Sprung, Felfe, Horn, Lynch & Kramer

[57] ABSTRACT

An apparatus for rotatably mounting a web on a spool including two chucks, each carried by a shaft which is rotatably mounted in a mounting frame, and each having a mandrel axially delimited by a stop flange and on which the spool is releasably clamped. Each chuck has a stripping ring disposed around the mandrel between the stop flange and a spool to be received, and configured to be axially slidable therealong, and wherein the ring comprises an axially extending collar. An actuating device is mounted on the mounting frame and is coactive with the stripping ring to effect the axial displacement thereof away from the stop flange so as to strip the spool from the mandrel. The actuating device comprises a pressure member mounted for movement from a rest position to an operative position and having elements for grasping the collar of the ring at at least two points uniformly distributed over its periphery and pushing it away from the stop flange when in the operative position, and permitting the free rotation of the ring when in the rest position.

5 Claims, 2 Drawing Figures

CHUCK FOR WEBS OF MATERIAL WOUND ONTO SPOOLS

BACKGROUND OF THE INVENTION

The invention relates to a chuck which, carried by a shaft, is rotatably mounted in a frame and on whose mandrel, laterally limited by a stop flange, a spool of a roll of web material may be clamped.

Chucks of this type are known which have radially spreadable gripping jaws actuable by means of a cylinder-piston arrangement and a wedge drive, for example. Such chucks will hold the spool centered, and while they have proven themselves in actual use, stripping the spools off the mandrel can be a problem, since the spool seizes on the mandrel as the roll is unwound. The empty spool must be loosened and stripped by hand, often with the aid of a heavy tool.

SUMMARY OF THE INVENTION

The object of the invention is to improve chucks of the type described above in such a way that spools carrying webs of material may be stripped from the mandrel without the use of muscle power or heavy tools.

In accordance with the invention, this object is accomplished in that the mandrel carries, between a stop flange and the spool, a ring provided with a freely overhanging collar and which is slidable on the mandrel, and that the frame carries actuating means acting upon the ring so as to strip the spool from the mandrel. The actuating means comprises a pressure member which is adapted to be acted upon by a drive and in the rest position is supported on abutments on the frame, and which grasps the collar of the ring at two or more points uniformly distributed over its periphery and is freely rotatable on or in the ring when the pressure member is in the rest position.

With the chuck in accordance with the invention, the axial force necessary to strip off the spool is transmitted through the ring directly to the spool, the force acting directly upon the end of the spool. The ring clamped between stop flange and spool is able to turn with the mandrel when the pressure member is in the rest position. The abutments then provide assurance that the pressure member is in the position in which it permits the ring to turn freely.

In accordance with one embodiment of the invention, the pressure member consists of a frame fixed to a rod and of claws fixed to the frame and grasping the collar. The abutments are preferably provided with prism-shaped guide surfaces for the pressure member. In this way, a very precise rest position is obtained for the pressure member without the need for further guiding means.

The frame of the pressure member, which with its rod is mounted in guides so as to be axially displaceable, is shaped like a fork, the prongs of the fork being disposed diametrically relative to the shaft. When pressure is exerted, the pressure therefore is applied uniformly to the ring without the pressure member being canted.

The invention will now be described in greater detail with reference to the drawings illustrating an exemplified embodiment wherein:

DETAILED DESCRIPTION OF THE INVENTION

Figure 1:
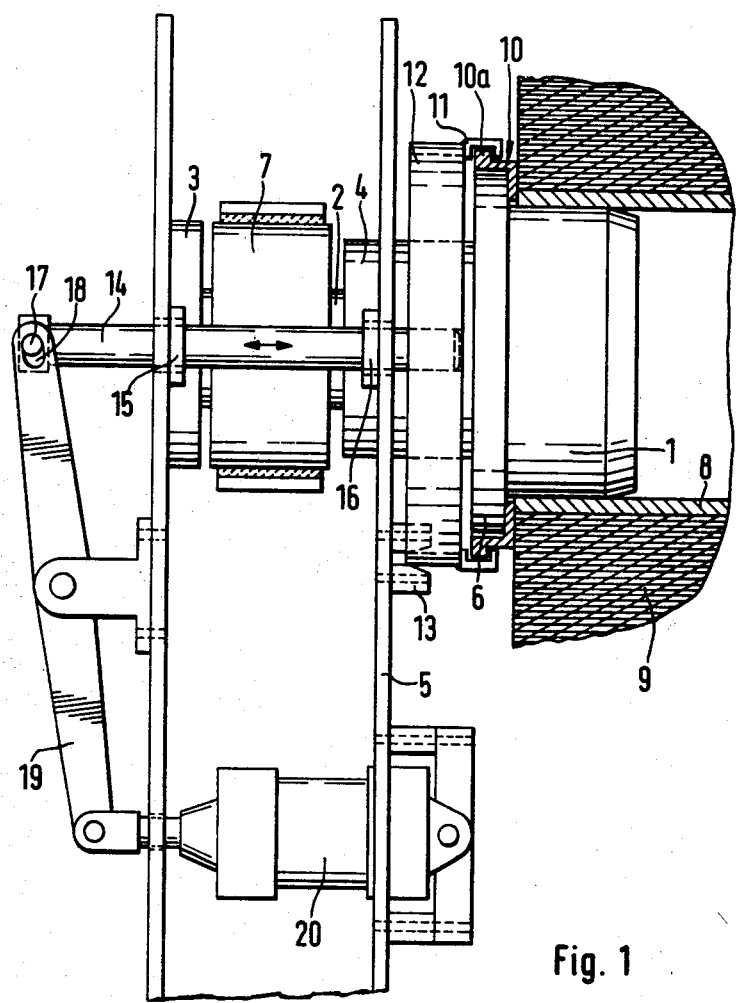
FIG. 1 is a side elevation view of a portion of the frame and of the chuck according to the invention.
Figure 2:
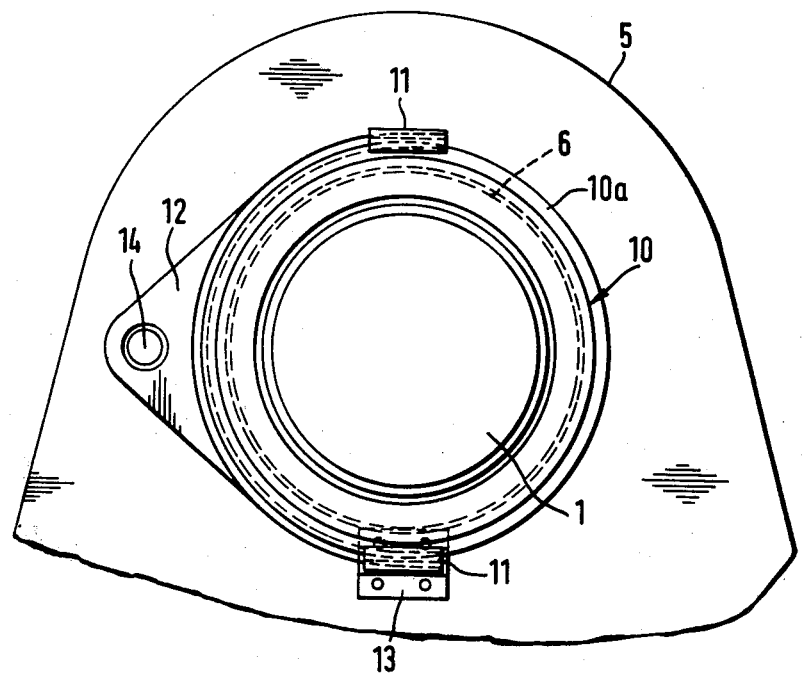
FIG. 2 is a view of the front portion of the pressure member of the chuck, taken in the axial direction of the mandrel.

Referring now to FIGS. 1 and 2, the chuck comprises a mandrel 1 which, as pointed out earlier in connection with the background of the invention, is provided with spreadable jaws which are not shown since they are not essential to an understanding of the invention. The mandrel 1 is rotatably mounted by means of a shaft 2 in bearings 3 and 4 of a frame 5. The mandrel 1 is delimited in the direction of the frame by a stop flange 6. Mounted on the mandrel 1 is a spool 8 which carries a roll 9 of web material to be unwound. The spool 8 with the roll 9 of web material is carried by means of two such chucks, including the mandrel 1 and the stop flange 6, which are set into the opposite ends of the spool 8. The brake drum 7 mounted on the shaft 2 causes the unwinding roll 9 of web material to be braked.

Mounted on the mandrel 1 between the stop flange 6 and the spool 8 is a stripping ring 10 configured to have an axial portion and a radial portion. The free collar 10a on the axial portion of ring 10 is acted on by a pressure member having claws 11 or by a ring having an internal groove for grasping the collar 10a. The pressure member also includes a frame 12 surrounding the bearing 4, the frame 12 being held, in the rest position shown in FIG. 1, in abutments 13 which are formed by three uniformly distributed prism-shaped stops in such a way that the ring 10 by its free collar 10a is able to turn freely in the claws 11.

The pressure member also includes a rod 14 which holds frame 12 and is able to slide axially in guides 15 and 16 of the frame 5. The frame 12 is in the form of a U-shaped fork with the clear span between its prongs being somewhat greater than the diameter of the stop flange 6 so that the frame 12 may be moved forward over the flange in the direction of the spool 8. A pin 17 disposed at the end of the rod 14 which is opposite the frame 12 sits in an elongated hole 18 in a two-armed lever 19 fulcrumed on the frame 5. The opposite end of the lever 19 is engaged by a cylinder-piston arrangement 20. By means of the lever 19 and the cylinder-piston arrangement 20, which together form the drive for the pressure member and all of which form actuating means for the stripping ring 10, the pressure member, including elements 11, 12 and 14, can be caused to move the ring 10 axially along the mandrel 1. Thus, when a pressure medium is admitted to the cylinder-piston arrangement 20, the ring 10 is shifted toward the right, in the position shown, so that the spool 8 along with the roll 9 of web material is stripped from the mandrel 1.

The chuck in accordance with the invention thus permits the spool 8, which during unwinding becomes jammed on the mandrel 1, to be stripped therefrom without muscle power or tools having to be used. Moreover, provision is made to assure that when the actuating means is in the rest position it does not interfere with the rotation of the chuck.

It will be appreciated that the instant specification and claims are set forth by way of illustration and not limitation and that various changes and modifications may be made without departing from the spirit and scope of the present invention.

What is claimed is:

1. In an apparatus for rotatably mounting a web on a spool including two chucks, each carried by a shaft which is rotatably mounted in a mounting frame, and each having a mandrel axially delimited by a stop flange and on which the spool is releasably clamped, the improvement comprising for each chuck: a stripping ring disposed about the mandrel between the stop flange and a spool to be received and configured to be axially slidable therealong, wherein the ring comprises an axially extending collar, and actuating means mounted on the mounting frame and coactive with the stripping ring to effect the axial displacement thereof away from the stop flange so as to strip the spool from the mandrel, said actuating means comprising a pressure member mounted for movement from a rest position to an operative position and having means for grasping the collar of the ring at at least two points uniformly distributed over its periphery and pushing it away from the stop flange when in the operative position, and permitting the free rotation of the ring when in the rest position.

2. The apparatus according to claim 1, wherein the pressure member comprises a pushing frame, a rod fixed to the frame, and claws fixed to the pushing frame and grasping the collar.

3. The apparatus according to claim 1, wherein the actuating means further comprises abutments on the mounting frame for supporting the pressure member in the rest position.

4. The apparatus according to claim 3, wherein the abutments are provided with prism-shaped guide surfaces for the pressure member.

5. The apparatus according to claim 2, wherein the pushing frame of the pressure member is mounted for axial displacement along the rod and has a U-shaped forklike configuration with its prongs disposed circumferentially of the chuck shaft.

* * * * *